United States Patent

[11] 3,607,900

[72] Inventor George Morris Hart
 Adrian, Mich.
[21] Appl No 871,347
[22] Filed Sept. 25, 1969
[45] Patented Sept. 21, 1971
[73] Assignee Stauffer-Wacker Silicone Corporation

[54] TRANSHALOGENATION OF ORGANOSILICON HALIDES WITH SILICON TETRAFLUORIDE
 4 Claims, No Drawings

[52] U.S. Cl.................................................. 260/448.2 E
[51] Int. Cl. ........................................... C07f 7/02
[50] Field of Search............................... 260/448.2

[56] References Cited
 UNITED STATES PATENTS
3,128,297 4/1964 Kanner et al. ................ 260/448.2
3,337,597 8/1967 Berger........................... 260/448.2

Primary Examiner—Tobias E. Levow
Assistant Examiner—Werten F. W. Bellamy
Attorneys—Marion D. Ford, Robert C. Sullivan and Lloyd L. Mahone ABSTRACT: An aqueous solution of tetrahydrofuran is saturated with silicon tetrafluoride and the resulting product, after removal of excess tetrahydrofuran, is applied as a transhalogenation reagent. The silicon tetrafluoride-tetrahydrofuran complex transhalogenation reagent is caused to react with diorganosilicon monohalides of the formula $(R)_2HSiX$ wherein R represents hydrocarbyl groups and X represents chlorine, bromine and iodine forming the fluoride analogue thereof.

TRANSHALOGENATION OF ORGANOSILICON HALIDES WITH SILICON TETRAFLUORIDE

This is a divisional of application Ser. No. 689,755, filed Dec. 12, 1967 now U.S. Pat. No. 3,507,799.

This invention concerns a transhalogenation reagent and more particularly relates to such a reagent which is adapted to the preparation of fluoro-analogues of compounds conforming to the formula

in which R is a substituted or unsubstituted hydrocarbon group and X is from the class consisting of chlorine, bromine and iodine.

Using strong fluorinating agents as aqueous hydrofluoric acid, it has been exceedingly difficult to effect these transhalogenation reactions without disrupting the Si-H bond. Conversely, when a weak fluorinating agent, e.g. gaseous $SiF_4$, is employed, the yield of the desired compound is so low as to be without significance. Using other previously disclosed fluorinating agents, antimony trifluoride for example, difficulties result as a consequence of the reagent becoming dissolved in the reaction mixture. Thus, accurate control of contact time is precluded and the purification of the product complicated.

On the foregoing, it should be apparent that the present invention has as its principal object the provision of a reagent for the indicated reaction which has the capability of effecting the transhalogenation in acceptable yield without disruption of the Si-H bond. Another major object is to provide a reagent which can be readily and quickly separated from the reaction mixture at the end of the selected reaction period.

The reagent herein is prepared by bubbling gaseous silicon tetrafluoride into aqueous tetrahydrofuran until absorption of the silicon tetrafluoride has ceased and then repeatedly extracting the mixture with a suitable solvent as heptane, for instance, to remove excess tetrahydrofuran. The reaction between the tetrahydrofuran and the silicon tetrafluoride, which apparently yields a complex of the two compounds, is exothermic, a condition conveniently used to determine when the reaction is complete. Thus, as the invention is normally practiced, the silicon tetrafluoride gas in excess is continuously cycled through the aqueous tetrahydrofuran until the reaction mixture cools to room temperature from the temperature characterizing the exotherm.

The amount of water in the aqueous tetrahydrofuran subjected to the ebullition is not critical. Indeed, one may practice the invention using as much water as possible without causing the precipitation of silica. Thus, in some cases, the solution may contain as much as 50 percent by volume of water.

The lower limit on the water is set by the amount required to insure phase separation of the reagent in use. In general, excellent results are obtained if the aqueous tetrahydrofuran into which the silicon tetrafluoride is bubbled contains about 20 percent water by volume.

The aforementioned complex which is believed formed incident to the ebullition is considered comprised of tetrahydrofuran and hexafluorosilicic acid ($H_2SiF_6$). The equation for the reaction of silicon tetrafluoride and water alone is as follows:

$$3SiF_4 + 2H_2O \rightarrow 2H_2SiF_6 + SiO_2$$

Such reaction is characterized by the formation of a white precipitate of $SiO_2$, the $H_2SiF_6$ remaining in solution. Significantly, when the hydrolysis is carried out in aqueous THF according to the invention, no precipitate is observed. Instead, a homogeneous system is obtained in the form of a clear, oily, fuming liquid which may darken progressively upon standing if the tetrahydrofuran contains a stabilizer preventing peroxide formation.

The repeated extraction of the reagent mixture to free it of excess tetrahydrofuran is highly important as promoting sharp phase separation in use of the reagent. Up to three extractions with equal parts of heptane or other suitable solvent is recommended. Properly prepared, the reagent will quickly phase separate from reaction mixtures including solvents such as heptane, hexane, benzene, toluene, xylene and the like.

As suggested, use of the reagent involves merely adding the same to a solution of the chloro-, bromo- or iodo-compound and maintaining the resulting mixture in a state of agitation for the period of time required to consummate the desired reaction. In general, the reaction goes best at temperatures within the range −10° to 20° C. Once the reaction is complete, the mixture is simply permitted to stand until stratification occurs, whereafter the organic and inorganic layers are separated by decantation and the former subjected to any further purification treatment necessary.

It should not be taken that the use of the reagent is limited to transhalogenation reactions requiring preservation of a Si-H bond, although the reagent is considered especially valuable as so applied.

The reagent is an outgrowth of a project having as its object the conversion of highly arylated chloro-silanes to the corresponding fluoro-silanes. The second of the following examples illustrates use of the reagent for such purpose.

EXAMPLE 1

Preparation of the Reagent

Silicon tetrafluoride gas was bubbled through a mixture of tetrahydrofuran (250 ml.) and distilled water (50 ml.). To conserve the gas, conventional means were provided whereby gas passing the liquid could be recycled therethrough. The reaction between the gas and THF was marked by an exotherm, complete disappearance of which was accepted as showing maximum absorption, i.e. completion of the reaction between the $SiF_4$ and THF.

To remove excess THF, the reacted mixture was treated with three consecutive 300 ml. portions of n-heptane by first mixing and then phase separating the mixtures. Excess THF was extracted and carried away in the upper heptane phase in each instance, leaving the lower inorganic phase finally concentrated to about one-third of its original volume.

EXAMPLE 2

The reagent as prepared above was added to an n-hetane solution of cyclohexyl-1-naphthylchlorosilane. One-thousand mls. of n-heptane were used. The concentration of the chlorosilane therein was 27 percent by weight.

The mixture including the reagent was stirred for 1 hour, the temperature of the mixture being maintained at or about 1° C. during the reaction period through the use of dry ice. On cessation of the stirring, two phases quickly developed and the lower phase was removed and discarded. The organic layer was treated with 5-A Molecular Sieves along with nitrogen sparging for 1 hour. The decanted solution was distilled and the fraction boiling at 93°–98° C./0.5 mm. Hg. and weighing 196 gr (46 percent yield) was collected as a product.

A composite sample consisting of 342 grams collected in a series of preparations was redistilled to give 324 grams of a slightly amber colored liquid b.p. 94°–96° C./0.05 mm. Hg. Gas liquid chromatographic analysis indicated that the sample was cyclohexyl-1-naphthylfluorosilane having no detectable impurities.

The invention claimed is:

1. In the preparation of the fluoro-analogue of a compound corresponding to the formula

in which R is a cyclic hydrocarbon group and X is selected from the class consisting of chlorine, bromine and iodine, the method which comprises contacting said compound with a tetrahydrofuran-silicon tetrafluoride complex containing from 20 to 50 percent by volume of water at a temperature of from about −10° to 20° C., said complex obtained by bubbling gaseous silicon tetrafluoride into aqueous tetrahydrofuran and thereafter extracting the mixture with an organic solvent to remove the excess tetrahydrofuran.

2. Method according to claim 1 wherein both R's are aryl radicals.

3. Method according to claim 1 wherein one R is alicyclic and the other R is bicyclic.

4. Method according to claim 1 wherein cyclohexyl-1-naphthylchlorosilane is converted to cyclohexyl-1-naphthyl-fluorosilane.